(12) United States Patent
Jung et al.

(10) Patent No.: US 6,822,675 B2
(45) Date of Patent: Nov. 23, 2004

(54) METHOD OF MEASURING DIGITAL VIDEO QUALITY

(75) Inventors: Joel Jung, Guyancourt (FR); Jorge E. Caviedes, Yorktown Heights, NY (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 541 days.

(21) Appl. No.: 10/014,242

(22) Filed: Dec. 11, 2001

(65) Prior Publication Data

US 2003/0011679 A1 Jan. 16, 2003

(30) Foreign Application Priority Data

Jul. 3, 2001 (EP) ............................................ 01401779

(51) Int. Cl.⁷ ................................................ H04N 5/21
(52) U.S. Cl. ...................... 348/180; 348/607; 348/608; 348/701; 382/268; 382/275
(58) Field of Search ................................ 348/180, 181, 348/189, 192, 193, 607, 608, 606, 618, 619, 615, 620, 666, 909, 701, 425.2; 375/240.27, 240.24, 240.29, 240.01; 386/114, 116; 382/268, 199, 206, 205, 269, 275; 324/613, 614, 628, 620, 704, 76.11

(56) References Cited

U.S. PATENT DOCUMENTS

| | | | | | |
|---|---|---|---|---|---|
| 4,754,492 A | * | 6/1988 | Malvar | ....................... | 392/268 |
| 5,454,051 A | * | 9/1995 | Smith | ........................ | 382/233 |
| 5,495,538 A | * | 2/1996 | Fan | ............................ | 382/233 |
| 5,654,759 A | * | 8/1997 | Augenbraun et al. | .. | 375/240.03 |
| 5,748,796 A | * | 5/1998 | Pennino et al. | ............. | 382/254 |
| 5,799,111 A | * | 8/1998 | Guissin | ...................... | 382/254 |
| 5,802,218 A | * | 9/1998 | Brailean | ..................... | 382/275 |
| 5,819,035 A | * | 10/1998 | Devaney et al. | ............ | 709/202 |
| 5,844,614 A | * | 12/1998 | Chong et al. | .......... | 375/240.24 |
| 5,883,983 A | * | 3/1999 | Lee et al. | ................... | 382/268 |
| 6,061,100 A | * | 5/2000 | Ward et al. | ................. | 348/607 |
| 6,327,307 B1 | * | 12/2001 | Brailean et al. | ....... | 375/240.29 |
| 6,359,658 B1 | * | 3/2002 | He et al. | .................... | 348/607 |
| 6,600,839 B2 | * | 7/2003 | Mancuso et al. | ........... | 382/268 |
| 6,611,295 B1 | * | 8/2003 | Drouot et al. | .............. | 348/607 |

FOREIGN PATENT DOCUMENTS

| | | | | | |
|---|---|---|---|---|---|
| EP | 0 881 837 A1 | * | 2/1998 | ............ | H04N/7/30 |
| WO | WO 97/37322 | * | 10/1997 | ............ | G06K/9/36 |
| WO | WO0120912 | | 3/2001 | ............ | H04N/7/30 |

OTHER PUBLICATIONS

"An Efficient Real Time Algorithm to Simultaneously Reduce Blocking and Ringing Artifacts of Compressed Video", by Hong et al, Digital Media Research Lab., LG Electronics, Seoul Korea, 1999 IEEE, pp. 899–903.*
"Method for Eliminating Blocking Effect in Compressed Video Signal", by Min–Cheol Hong, U.S. patent application Publication, US 2001/0003545 A1, Jun. 14, 2001.*

* cited by examiner

*Primary Examiner*—Michael H. Lee
*Assistant Examiner*—Jean W. Désir

(57) ABSTRACT

The present invention relates to a method of measuring video quality. Said method comprises a step of determining (21) at least one reference level (JND) above which visual artifacts become noticeable to a group of subjects, with a corresponding predetermined artifact metric (M), from a set of reference sequences (RS) of digital pictures only comprising a corresponding artifact. The method of measuring video quality also comprises a step of measuring (22) at least one artifact level (L) of the input sequence (IS) with the corresponding predetermined artifact metric (M). It further comprises a step of computing (23) a video quality metric (OQM) of the input sequence from at least one ratio of the artifact level (L) to the reference level (JND) corresponding to a same predetermined artifact metric. Such a method of measuring video quality provides an objective quality metric.

9 Claims, 4 Drawing Sheets

METHOD OF MEASURING DIGITAL VIDEO QUALITY

Figure 1:
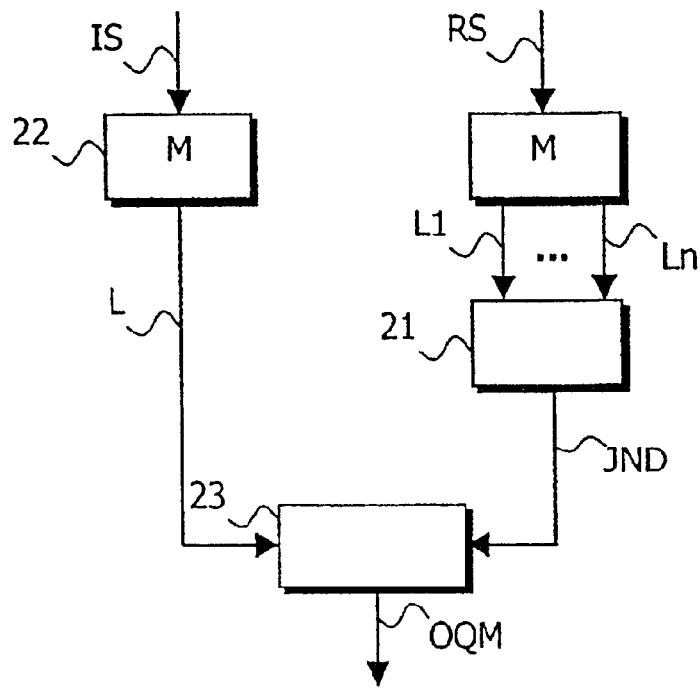

The present invention relates to a method of measuring video quality of an input sequence of digital pictures.

The invention also relates to a corresponding device for carrying out such a method of measuring video quality.

This invention may be used in, for example, digital television in order to create a measurement scale for impairments to digital video. As a consequence of said application, a method of post-processing may be applied to a sequence of pictures depending on the measurement scale of said sequence of pictures. Said post-processing method can reduce the visibility of visual impairments such as blocking artifacts, ringing artifacts and corner outliers.

Evaluation of video quality is generally performed using subjective tests, based on evaluation by naive human subjects. These methods are expensive, time consuming, subjective and not applicable for in-service testing, as they are based on comparison of an encoded sequence of pictures with an original sequence of pictures as reference.

Other methods have been developed to evaluate video quality. These methods are based on impairment metrics, and more especially on blocking artifact metrics. For example, such a method is described in the international application WO 01/20912. Said method relates to a method of detecting blocking artifacts in digital video pictures. The detection method comprises a step of filtering a digital input signal using a gradient filter for providing at least one filtered signal and a step of calculating a block level metric for processing the filtered signal(s) to identify and count blocking artifacts as a function of their position in a grid. If the block level metric is lower than a threshold, the picture has either not been encoded using a block-based processing, or has been encoded in a seamless way. In the opposite case, the picture has been encoded using a block-based processing in a non-seamless way and corrective actions, such as post-processing, can be taken.

But such a method is only able to measure a comparative blocking artifact level in order to apply a suitable post-processing, and, as a consequence, is neither able to perform a really objective measurement of the video quality, nor sensitive to other visual impairments.

It is an object of the invention to provide a method of measuring digital video quality for an input sequence of pictures, which provides a more objective quality metric.

To this end, the method of measuring digital video quality in accordance with the invention is characterized in that it comprises the steps of:

determining at least one reference level above which visual artifacts become noticeable to a group of subjects, with a corresponding predetermined artifact metric, from a set of reference sequences of digital pictures only comprising a corresponding artifact, measuring at least one artifact level of the input sequence with the corresponding predetermined artifact metric, computing a video quality metric of the input sequence from at least one ratio of the artifact level to the reference level corresponding to a same predetermined artifact metric.

Such a method of measuring video quality is based on the determination of at least one reference level. Thus, the amount of at least one predetermined visual artifact is weighted according to the at least one reference level. Said reference level can be seen as a perception factor and the determining step of said reference level as a perceptual calibration. As a consequence, the method of measuring video quality calculates a video quality metric with reference to at least one perceptual level, leading to a more objective quality metric.

Moreover, said method of measuring is multidimensional in the preferred embodiment, as it is based on a combination of impairment metrics. Said impairment metrics are determined from the three main visual artifacts resulting from digital compression, which are blocking, ringing and corner outlier artifacts, and which are independently quantified.

Thus, the method of measuring video quality is more complete compared with the prior art and leads to an even more objective quality metric.

Figure 2A:
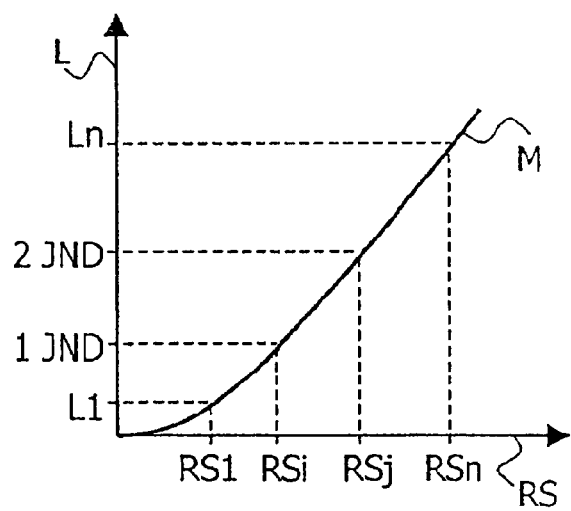
Figure 2B:
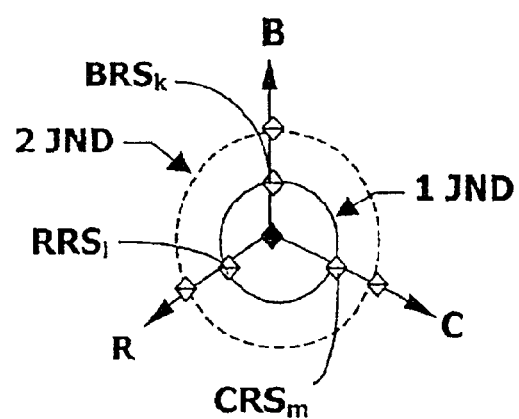
Figure 3A:
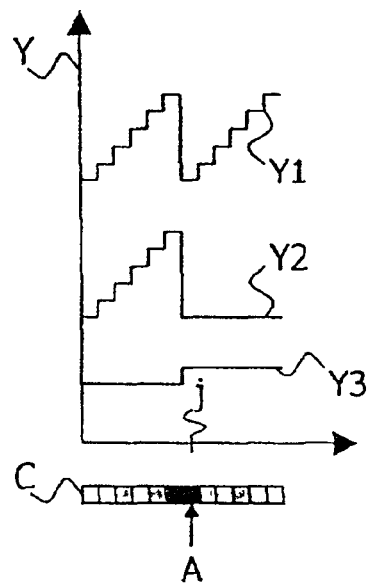
Figure 3B:
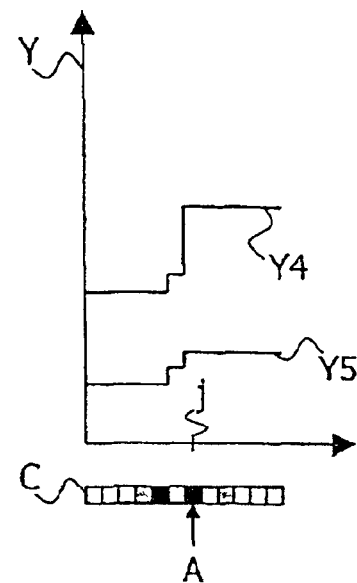
Figure 4:
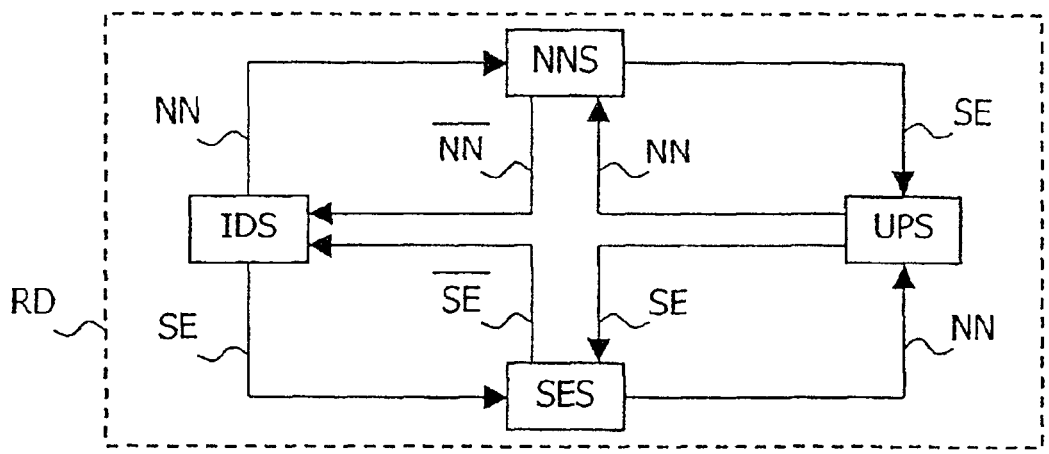
Figure 5:
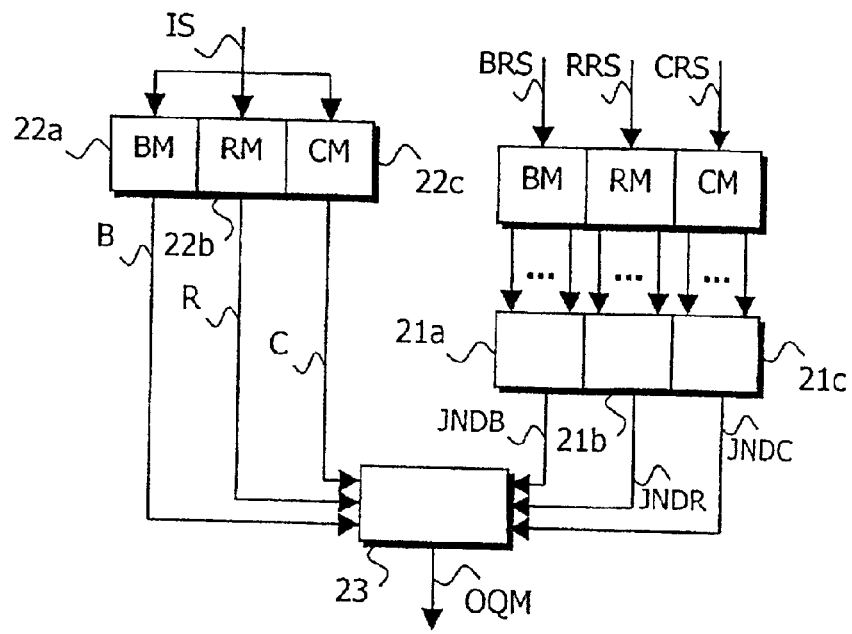
Figure 6:
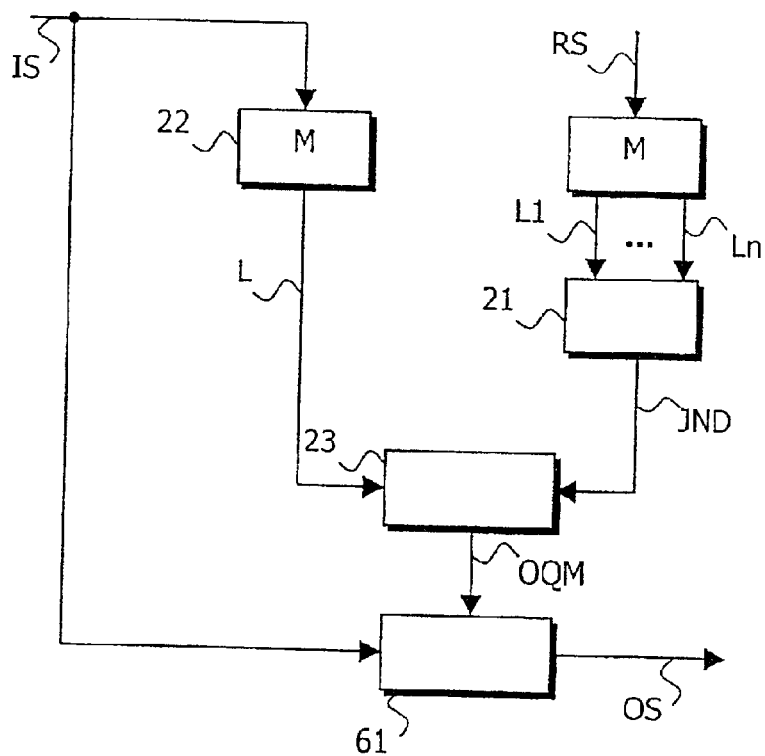
Figure 7:
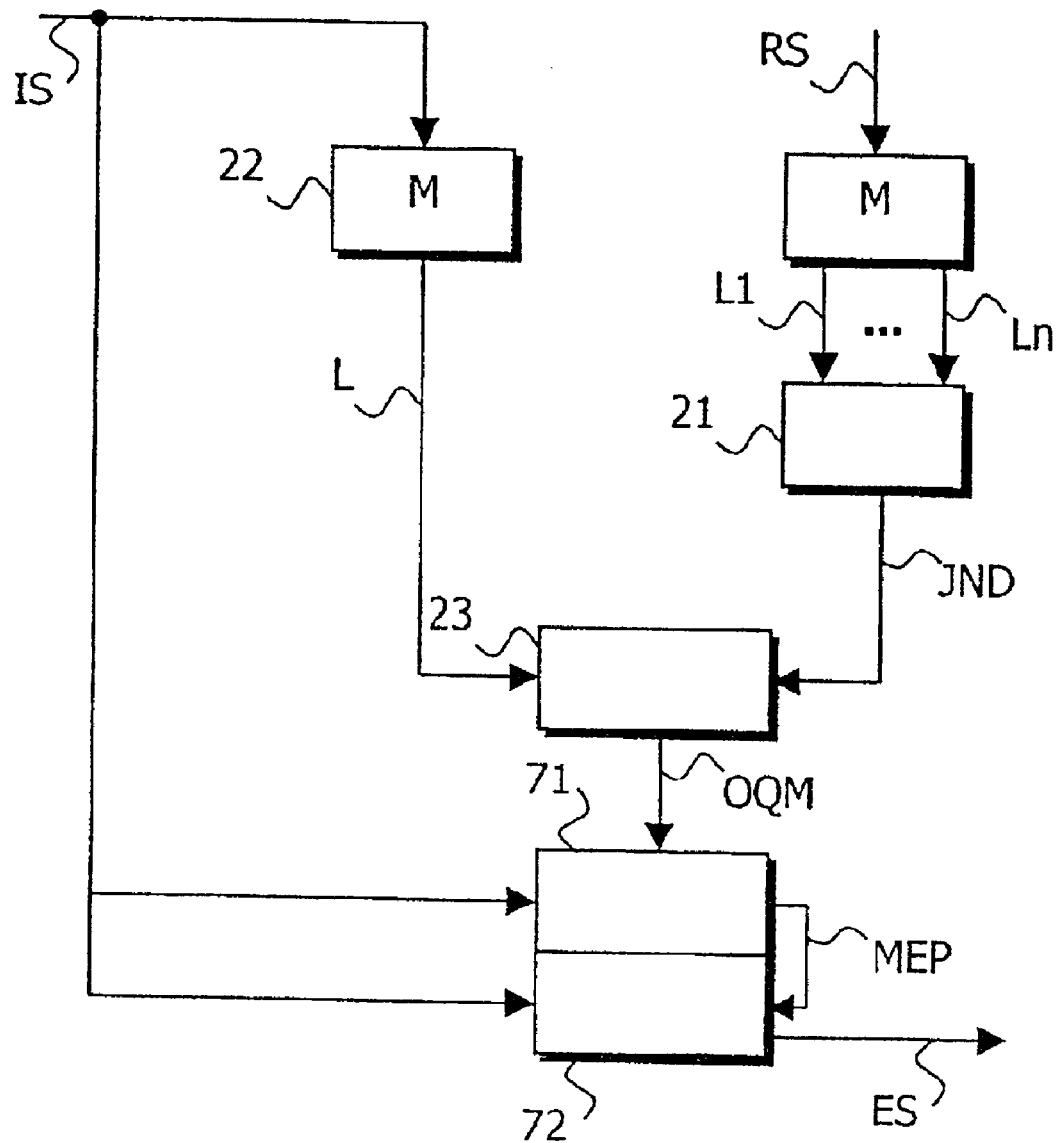

The present invention will now be described in more detail, by way of example, with reference to the accompanying drawings, wherein:

FIG. 1 is a block diagram corresponding to a method of measuring video quality in accordance with the invention, FIG. 2a and FIG. 2b illustrate a procedure of subjective tests in accordance with the invention, FIGS. 3a and 3b illustrate a blocking artifact metric in accordance with the preferred embodiment of the invention for various pixel configurations, FIG. 4 illustrates a ringing artifact metric in accordance with the preferred embodiment of the invention, FIG. 5 is a block diagram corresponding to a multidimensional method of measuring video quality in accordance with the invention, FIG. 6 is a block diagram corresponding to a method of post-processing in accordance with the invention, and FIG. 7 is a block diagram corresponding to an encoding method in accordance with the invention.

The present invention relates to an improved method of measuring video quality for an input sequence of digital pictures. It relates, more especially, to MPEG encoded sequences but it will be apparent to a person skilled in the art that said method stays also applicable to any type of video sequences encoded with a block-based technique such as, for example, those provided by MPEG-1, MPEG-4, H-261 or H-263 standards.

Said method of measuring video quality is described in FIG. 1 and comprises a step of determining (21) at least one reference level (JND) above which visual artifacts become noticeable to a group of subjects, with a corresponding predetermined artifact metric (M), from a set of reference sequences (RS) of digital pictures only comprising a corresponding artifact. The method of measuring video quality also comprises a step of measuring (22) at least one artifact level (L) of the input sequence (IS) with the corresponding predetermined artifact metric (M). It further comprises a step of computing (23) a video quality metric (OQM) of the input sequence from at least one ratio of the artifact level (L) to the reference level (JND) corresponding to a same predetermined artifact metric.

The method of measuring video quality is based on the determination of at least one reference level above which visual impairments become noticeable to a group of subjects, for at least one visual artifact metric. In order to determine the reference level, a test procedure, illustrated in FIG. 2a, is performed once and for all for a predetermined impairment metric. To this end, a set of reference sequences (RS0 to RSn) is used, containing an original sequence (RS0) and sequences (RS1 to RSn) encoded at different bit rates, from 1 to 10 Megabits per second, for example. The artifact level is a monotonous unction that increases with the bit rate. For the original sequence (RS0), the artifact level is 0. For an encoded sequence RS1, the artifact level is L1 and for an encoded sequence RSn, the artifact level is Ln.

The set of reference sequences must be affected by one impairment at a time, for example, blocking artifact if the impairment metric is a blocking artifact metric, in order to determine a blocking artifact level. As a consequence, post-processing algorithms are applied to the encoded sequences in order to remove undesirable visual artifacts. If we want to keep only blocking artifacts, a first solution is to detect ringing artifacts and corner outliers using a ringing artifact metric and a corner outlier metric, respectively, and then to filter said ringing artifacts and corner outliers. A second solution is to keep the block boundaries of the encoded sequences of pictures and to complete them with the content of the original sequence of pictures. If we want to keep only ringing artifacts, a solution is to detect blocking artifacts and corner outliers by using a blocking artifact metric and a corner outlier metric, respectively, and then to filter said blocking artifacts, thanks to a DFD algorithm, for example, and said corner outliers. If we want to keep only corner outliers, a solution is to detect corner outliers by using a corner outlier metric and to replace the original pixels corresponding to the detected corner outliers in the original sequences of pictures by said detected corner outliers.

The test procedure comprises the steps of:

setting score of sequences, each affected by one impairment only, in order to find the one (RSi) that lies one unit, called JND for Just Noticeable Difference, away from the original sequence,
repeating the preceding step, in order to find the next reference sequence (RSj) that lies one JND away from the 1-JND sequence (RSi), and so on.

These steps are called 1-JND test and aim at calibrating impairment metrics independently according to a subjective quality scale. The 1-JND test consists in subjectively scoring sequences in which one impairment (B,R or C) has been increased while the others remain approximately constant. The impairment under test is increased to a point where subjects can notice a difference. The levels at which subjects notice a difference are called perception factors (JNDB, JNDR, JNDC). This test is a way to introduce multi-dimensionality to the subjective quality assessments, establish anchor points on the critical 1-JND loss envelope, and carry on the calibration into the overall quality metric.

When several reference levels have been determined, the test procedure further comprises a step of finding a rank order of the sequences ($BRS_k$, $RRS_l$, $CRS_m$) that are on the 1-JND radius set in order to identify any perceptual imbalances among impairments. This step is also called 1-JND set-ranking test and is illustrated in FIG. 2b. The 1-JND set-ranking test consists in a two-alternative forced choice method of all possible pairs within the set 1-JND sequences away from the impossible.

The method of measuring video quality can be implemented with only one impairment metric. In this case, the impairment metric is the blocking artifact metric, as the blocking artifact is the more annoying visual artifact. But a multidimensional method of measuring video quality is preferable and gives a more accurate video quality metric. Several impairments can be taken into account in the method in accordance with the invention. The set of impairment candidates includes blocking artifacts, ringing artifacts, corner outliers, mosquito noise, which is a temporal noise, spatial noise, blurring, clipping, line flickering or transmission errors. The multidimensional method can also take into account attribute candidates including sharpness, contrast or resolution. Compared with impairment candidates, who are undesirable features, attribute candidates are desirable features.

The different impairment metrics are chosen according to the following criteria:

the linear independence,
the perceptual impact of each impairment,
a high precision with a minimum of false results,
the choice of a set of metrics complete enough to account for most relevant impairments.
Moreover, the impairment metrics must be monotonous and growing functions and must be equal to 0 for sequences with no impairment.

In the preferred embodiment, the method of measuring video quality is based on a combination of the impairment metrics associated with the three main visual artifacts that are blocking artifacts, ringing artifacts, and corner outliers.

Several methods may be used to perform those measurements, said methods being either reference metrics, i.e. the measurement being performed with reference to original pictures, or no reference metrics. An example for each of the three main artifact metrics corresponding to no reference metrics, is described in the following part.

Blocking Artifact Metric

Blocking artifacts are the best known artifacts in video signals encoded with a block-based technique such as MPEG. They are discontinuities at the borders of 8×8 blocks resulting from a strong, independent quantization of blocks of transformed coefficients.

The blocking artifact metric has been selected on the basis of its ability to detect visible discontinuities at block edges with a minimum of errors. The metric is representative of the amount of artifacts and their visibility.

Said blocking artifact metric comprises a gradient filtering step of the luminance values Y of pixels in order to detect an area of natural edges in a current picture, and thus to avoid false detection. Indeed, texture or contour can be detected as block edges. The filters used are Sobel filters, which are chosen because of efficiency for robust edge detection. The Sobel filters are given below:

$$S_H = \begin{bmatrix} -1 & -2 & -1 \\ 0 & 0 & 0 \\ 1 & 2 & 1 \end{bmatrix} \quad S_V = \begin{bmatrix} -1 & 0 & 1 \\ -2 & 0 & 2 \\ -1 & 0 & 1 \end{bmatrix}$$

The filtered luminance values $G_H$ and $G_V$ after horizontal and vertical gradient filtering are $G_H = Y*S_H$ and $G_V = Y*S_V$, respectively. Said filtered luminance values are (compared to two thresholds. The value of those thresholds is low not to miss smooth texture, but not too low not to extract block boundary discontinuity. The horizontal and vertical threshold values $THR_H$ and $THR_V$ are, for example, 35 and 50, respectively, for luminance values coded from 0 to 255.

The blocking artifact metric also comprises a step of testing the nullity of the second derivative. Intuitively, this corresponds to the predictability of one sample knowing its two neighbors. The second derivative is null if:

$$2 \cdot Y(i,j) = Y(i-1,j) + Y(i+1,j)$$

in a vertical direction, $$2 \cdot Y(i,j) = Y(i,j-1) + Y(i,j+1)$$

in a horizontal direction, where Y(i,j) is the luminance value of a pixel of position (i,j) within the picture. Vertical and horizontal discontinuity values $c_v(i,j)$ $c_h(i,j)$ are derived from the preceding equations. In the preferred embodiment, we have:

$$c_v(i,j) = \begin{cases} 1 & \text{if } 2 \cdot Y(i,j) = Y(i-1,j) + Y(i+1,j) \\ 0 & \text{otherwise} \end{cases}$$

$$c_h(i,j) = \begin{cases} 1 & \text{if } 2 \cdot Y(i,j) = Y(i,j-1) + Y(i,j+1) \\ 0 & \text{otherwise} \end{cases}$$

Then, the blocking artifact metric comprises a step of determining horizontal and vertical artifact values Ah and Av from the discontinuity values. FIGS. 3a and 3b illustrate said blocking artifact determination for various pixel configurations. A discontinuity value equal to zero, i.e. corresponding to a continuity break, is represented with a black square, whereas a discontinuity value equal to 1 is represented with a gray square. White squares are not taken into account.
An horizontal artifact Ah is detected if Ah=1, Ah being equal to:

$$Ah(i,j) = c_v(i,j) \cdot \overline{c_v(i+1,j)}$$

where c and $\bar{c}$ are complementary values.
A first type of blocking artifact Av1 is detected, as illustrated in FIG. 3a, if:

$$Av1(i,j) = \overline{c_h(i,j-1)} \cdot \overline{c_h(i,j)} \cdot (c_h(i,j+1) + c_h(i,j+3) + c_h(i,j-4) + c_h(i,j-2)).$$

A second type of vertical blocking artifact Av2 is detected, as illustrated in FIG. 3b, if:

$$Av2(i,j) = c_h(i,j-3) \cdot \overline{c_h(i,j-2)} \cdot \overline{c_h(i,j)} \cdot c_h(i,j2).$$

A vertical artifact Av is detected if Av1 or Av2 is equal to 1. All three tests have the same philosophy, test a discontinuity centered on the pixel of interest and test continuity in its neighborhood. The horizontal detection is very simple, even too simple. This is due to vertical sub-sampling, corresponding to the case of interlaced fields in a picture, where precision cannot be expected. The processing in a vertical direction may be very costly in terms of memory, so that complexity has to be reduced to the minimum acceptable. For example, in very dark areas some natural disruption can occurs, and the algorithm eliminates those areas from a detection window. Thus, the artifacts Ah and Av have been identified at a pixel level.

Finally, the blocking artifact metric comprises a step of identifying horizontal and vertical blocking artifacts. A horizontal or a vertical blocking artifact is identified if artifacts Ah and Av are present on an entire boundary of a block. A block has four boundaries: top, bottom, left and right. If H is the height and W is the width of a block, a blocking artifact is identified if H consecutive horizontal artifacts or W consecutive vertical artifacts are found. The horizontal and vertical blocking artifacts are then counted, resulting in a blocking artifact level (B) for a picture.

In order to test the accuracy of the metric, detected block edges have been highlighted on a current picture and then compared with a sharpness-enhanced version of said current picture to reveal any undetected artifact. The amount of undetected artifacts is almost negligible in all tests. In order to evaluate the error rate, we inspect visually that vertical and horizontal natural edges are not incorrectly detected as artifacts, and also test the blocking artifact metric on a varied set of non-coded sequences of pictures to see if the blocking level given by said metric is zero.

Regarding subjective quality scale, initial 1-JND tests indicate that the blocking artifacts introduce noticeable differences with this metric at a blocking metric level of JNDB=60 for a full resolution picture of a sequence when said sequence is mainly affected by blocking artifacts. Above a blocking metric level of 1000 the picture is so severely impaired that quality assessment is at the lowest level from that point on. Blocking is the best-behaved impairment. It increases almost monotonically with compression, but although one can find good examples of its consistent behavior.

Ringing Artifact Metric

Caused by coarse quantization of AC coefficients, ringing artifacts frequently appear near sharp edges that belong to low-activity regions of an image. Depending on the orientation of the edges, the artifacts can appear as shimmering along the edges or multiple echoes, which are harmonics of the fundamental edge frequencies. The principle of the ringing artifact metric is based on searching for reduced strength edges in the neighborhood of strong natural edges. The ringing artifact metric is proportional to the number of pixels that belong to the false edges in an image.

The ringing artifact metric cares for very low activity regions which, once encoded and decoded, would result in what is hereinafter called 'non-natural uniform areas', which are areas where there is almost no spatial activity and which hardly occur in natural images.

The ringing artifact metric comprises a first step of computing a value of spatial activity of a current pixel from pixels that are adjacent to said current pixel. In the preferred embodiment, the value of spatial activity $\sigma(i,j)$ of a current pixel of position (i,j) within a picture is computed from the luminance values (Y) of current and adjacent pixels as follows:

$$\sigma(i,j) = \sigma_h(i,j) + \sigma_v(i,j)$$

$$\sigma_h(i,j) = \text{abs}(Y(i,j) - Y(i,j+1)) + \text{abs}(Y(i,j) - Y(i,j-1))$$

$$\sigma_v(i,j) = \text{abs}(Y(i,j) - Y(i+1,j)) + \text{abs}(Y(i,j) - Y(i-1,j))$$

where abs(x) returns the absolute value of x.

The ringing artifact metric comprises a step of detecting a non-natural uniform area. A non-natural uniform area is detected if the spatial activity value σ of at least five consecutive pixels is lower than a predetermined threshold THR1, equal for example to 3. It may be interesting to care for the vertical direction, but results are good enough not to consider adding costly complexity.

The ringing artifact metric also comprises a gradient filtering step of the luminance values Y of pixels to detect strong edges. The same Sobel filters as in the blocking artifact metric are reused. The filtered luminance values $G'_H$ and $G'_V$ after horizontal and vertical gradient filtering are $G'_H = Y * S_H$ and $G'_V = Y * S_V$, respectively. Said filtered luminance values are compared to two thresholds. Strong edges are detected if the horizontal and vertical threshold values $THR'_H$ and $THR'_V$ are, for example, both equal to 150, for luminance values coded from 0 to 255.

The ringing artifact metric further comprises a step of determining an artifact potentially due to ringing. Such a potential artifact is detected if:

$$(\sigma_v(i,j) > 3) \, et \, (\sigma_v(i,j) > 4 \cdot \text{abs}(Y(i-1,j) - Y(i+1,j)))$$

or $$(\sigma_h(i,j) > 3) \, et \, (\sigma_h(i,j) > 4 \cdot \text{abs}(Y(i,j-1) - Y(i,j+1))).$$

Determination of ringing artifacts is not sufficient, because natural textures can easily be considered as ringing if analyzed without a wide area context. Nevertheless, we can at least reduce the chance of false detection by analyzing the areas within the image where ringing is likely to appear, that is between a non-natural uniform area and a strong intensity edge.

That is why the ringing artifact metric comprises a step of detecting ringing artifact if a potential artifact lies between a non-natural uniform area and a strong edge previously detected. FIG. 4 illustrates the ringing artifact detection step (RD). In an idle state (IDS), the detection step does nothing. When a non-natural uniform area is detected (NN), whereas the detection step is in its idle state, a state of non-natural area detection (NNS) is enabled and the ringing artifacts are counted during a period M pixels. When this M-period has expired, the detection step returns ($\overline{NN}$) to the idle state (IDS). When a strong edge is detected (SE), whereas the detection step is in its idle state, a strong edge state (SES) is enabled and ringing artifacts are counted during a period of P pixels. When this P-period has expired, the detection step returns ($\overline{SE}$) to the idle state (IDS). When a non-natural uniform area (NN) is detected, whereas the detection step is in the strong edge state (SES), the update state (UPS) is enabled. When a strong edge is detected (SE), whereas the detection step is in the state of non-natural area detection (NNS), the same appears. In said update state, a global ring counter is updated with the local counter from the incoming state, and the detection step returns to the state of non-natural area detection (NNS) if a non-natural uniform area is detected (NN), or in the strong edge state (SES) if a strong edge is detected (SE). The metric is applied in the horizontal and in the vertical directions, resulting in a ringing artifact level (R) for a picture.

Verification of ringing artifact metric precision and false detection rate can be done in an analogous way to the blocking artifact metric verification explained before. The ringing artifact metric is not monotonic for low compression rates in at least one case. Initial tests on subjective perception have been done by artificially creating sequences affected only by ringing artifacts as described hereinbefore. The results indicate that ringing artifacts become noticeable with this metric at about a ringing reference level of JNDR= 270.

Corner Outlier Metric

Corner outliers are missing pixels that belong to strong contrast natural edges, i.e. they look conspicuously too light or too dark compared to their surroundings. The missing pixels are placed at the corners of 8×8 MPEG blocks.

A corner outlier is detected by taking into account:

an absolute luminance difference between a candidate corner pixel and the average of the group of four neighboring corner pixels to which it belongs,
a perceptual visibility of that difference given the local average luminance,
a probability that the candidate pixel is a natural pixel simply aligned with the grid.

More precisely, if A, B, C and D are 4 pixels adjacent to each other and also 4 corners of 4 DCT blocks and if AVG is the mean value of the luminance values Y of said 4 pixels, the corner outlier metric detects a corner outlier if the 3 following criteria are fulfilled:

abs[$Y(A)-Y(C)$]>abs[$Y(B)-Y(D)$], abs[$Y(A)-Y(B)$]>abs[$Y(C)-Y(D)$], abs[$Y(A)-Y(B)$]>THR2 and abs[$Y(A)-Y(C)$]>THR2 and abs[$Y(A)-Y(D)$]>THR2, where THR2 is a predetermined threshold equal to 30, for example. The corner outlier metric results in a corner outlier level (R) for a picture.

Verification of corner outlier metric performance is straightforward, as corner outliers are usually few and highly visible. In contrast to the two metrics explained before, the corner outlier metric is a probabilistic indicator of corner outlier level, and is not based on a direct count of the pixels. The reason for this is mainly that the corner outlier metric is a non-reference metric and thus does not use encoding parameters, such as quantization scale, for example, to detect corner outliers.

Nevertheless, each of the first three impairment metrics presented so far incorporates a simple implementation of Weber's law in order to account for perceptual visibility, plus empirical thresholds to separate natural image content from artifacts. As it has been said before, other impairments may be added without departing from the scope of the invention. For example, in addition to the set of impairment metrics presented above, noise and blur/sharpness can make the set complete enough for practical applications.

The method of measuring video quality implementing the above described blocking artifact, ringing artifact, and corner outlier metrics is described in FIG. 5. It comprises a first step of determining (21a) a blocking reference level (JNDB) with the above described blocking artifact metric (BM), from a set of reference sequences (BRS) of digital pictures only comprising blocking artifacts, a second step of determining (21b) a ringing reference level (JNDR) with the above described ringing artifact metric (RM), from a set of reference sequences (RRS) of digital pictures only comprising ringing artifacts, and a third step of determining (21c) a corner outlier reference level (JNDC) with the above described corner outlier metric (CM), from a set of reference sequences (CRS) of digital pictures only comprising corner outlier artifacts. It further comprises a step of measuring (22a,22b,22c) a blocking artifact level (B), a ringing artifact level (R), and a corner outlier level (C) of the input sequence with the blocking artifact metric (BM), the ringing artifact metric (RM), and the corner outlier metric (CM), respectively. Said method of measuring video quality is adapted to compute a video quality metric, called overall quality metric (OQM). Said overall quality metric is computed from ratios of the blocking artifact level (B) to the blocking reference level (JNDB), the ringing artifact level (R) to the ringing reference level (JNDR), and the corner outlier level (C) to the corner outlier reference level (JNDC). We now propose an Overall Quality Metric (OQM) that is already calibrated in JND levels as follows:

$$OQM = \sqrt{\left(\alpha\left(\frac{B}{JNDB}\right)\right)^2 + \left(\beta\left(\frac{R}{JNDR}\right)\right)^2 + \left(\gamma\left(\frac{C}{JNDC}\right)\right)^2}$$

where $\alpha$, $\beta$, $\gamma$ are weighting factors. Said weighting factors allow the perceptual masking effect to be taken into account: when the most annoying artifact is present, it masks other artifacts. When said annoying artifact is reduced, the others visual artifacts appear more and more, although their amount are still the same. For example, if the ratio B/JNDB is higher than a threshold, than blocking artifacts mask other artifacts: $\alpha$ is big, $\beta$ and $\gamma$ are small. When the ratio B/JNDB decreases, the values of $\beta$ and $\gamma$ must be progressively increased. Moreover, when the ratios B/JNDB, R/JNDR and C/JNDC equal to 1JNDB, 1JNDR and 1JNDC, respectively, $\alpha$, $\beta$, $\gamma$ are set to $\frac{1}{3}$, so that the video quality metric equals to 1 JND.

The method of measuring video quality gives a quality metric that can be used advantageously in correction and control strategies.

As a first example, the method of measuring video quality may be included in a post-processing method. Such a post-processing method, illustrated in FIG. 6, is adapted to receive an input sequence of digital pictures (IS), and comprises the steps of determining (21) at least one reference level (JND) above which visual artifacts become noticeable to a group of subjects, with a corresponding predetermined artifact metric (M), from a set of reference sequences (RS) of digital pictures only comprising a corresponding artifact; measuring (22) at least one artifact level (L) of the input sequence with the corresponding predetermined artifact metric (M); computing (23) a video quality metric (OQM) of the input sequence from at least one ratio of the artifact level (L) to the reference level (JND) corresponding to a same predetermined artifact metric.

The post-processing method further comprises a correcting step (61), preferentially a low pass filtering step, of the input sequence of digital pictures (IS) as a function of the video quality metric (OQM), which results in an output signal (OS). Said low pass filtering step is applied to pixels of the input sequence of digital pictures around the block boundaries. The low pass filtering is disabled when the video quality metric is high, for example, lower than 1 JND. It is then enabled with a soft low pass filter when the video quality metric lies between 1 JND and 2 JND. The low pass filter becomes harder when the video quality metric lies between 2 JND and 3 JND and so on. The low pass filtering step advantageously comprises a sub-step of detection of natural edges in order to preserve them.

As a second example, the method of measuring video quality may be included in an encoding method comprising at least two encoding passes (71, 72). Such an encoding method, illustrated in FIG. 7, is adapted to receive an input sequence of digital pictures (IS). In a first encoding pass (71), the encoded output sequence of digital pictures is not generated but encoding parameters are computed for a current picture, such as, for example quantization scale of macroblocks of said picture, or complexity of said macroblocks, i.e. the product of the quantization scale of a macroblock with a number of bits necessary for encoding said macroblock. The encoding method also comprises the different steps (21,22,23) previously described for computing a video quality metric (OQM). In a second encoding pass (72), some encoding parameters are modified (MEP) as a function of the video quality metric in order to provide a sequence of encoded digital pictures (ES) corresponding to a given video quality chosen by a broadcaster or a user. For example, the complexity X of a macroblock of position (k,l) within the current picture is modified into Y as follows:

$$Y[k,l]=C(OQM[k,l]) \times X[k,l]$$

where C(OQM[k,l]) is a coefficient that is function of the video quality metric OQM of a macroblock of position [k,l] within the current picture.

The drawings of FIGS. 1, 5, 6 and 7 and their description hereinbefore refer to both a device and a method, a functional block of a diagram corresponding to a circuit of said device or a step of said method, respectively. They illustrate rather than limit the invention. It will be evident that there are numerous alternatives, which fall within the scope of the appended claims. In this respect, the following closing remarks are made.

There are numerous ways of implementing functions by means of items of hardware or software, or both. In this respect, the drawings of FIGS. 1, 5, 6 and 7 are very diagrammatic, each representing only one possible embodiment of the invention. Thus, although a drawing shows different functions as different blocks, this by no means excludes that a single item of hardware or software carries out several functions. Nor does it exclude that an assembly of items of hardware or software or both carry out a function.

The different methods can be implemented in a digital television or in a set-top-box in several manners, such as by means of wired electronic circuits or, alternatively, by means of a set of instructions stored, for example, in a programming memory, said instructions replacing at least part of said circuits and being executable under the control of a digital processor in order to carry out the same functions as fulfilled in said replaced circuits. For example, it is possible to implement the method of measuring video quality using an integrated circuit, which is suitably programmed. The set of instructions contained in the programming memory may cause the integrated circuit to carry out the different steps of the method of measuring video quality. The set of instructions may be loaded into the programming memory by reading a data carrier such as, for example, a disk. The set of instructions can also be made available by a service provider via a communication network such as, for example, the Internet.

Any reference sign in the following claims should not be construed as limiting the claim. It will be obvious that the use of the verb "to comprise" and its conjugations do not exclude the presence of any other steps or elements besides those defined in any claim. The word "a" or "an" preceding an element or step does not exclude the presence of a plurality of such elements or steps.

What is claimed is:

1. A method of measuring video quality of an input sequence (IS) of digital pictures, said method comprising the steps of:

determining (21) at least one reference level (JND) above which visual artifacts become noticeable to a group of subjects, with a corresponding predetermined artifact metric (M), from a set of reference sequences (RS) of digital pictures only comprising a corresponding artifact, measuring (22) at least one artifact level (L) of the input sequence with the corresponding predetermined artifact metric (M), computing (23) a video quality metric (OQM) of the input sequence from at least one ratio of the artifact level (L) to the reference level (JND) corresponding to a same predetermining artifact metric.

2. A method of measuring video quality as claimed in claim 1, comprising the steps of:

determining (21a) a blocking reference level (JNDB) with a predetermined blocking artifact metric (BM), from a set of reference sequences (BRS) of digital pictures only comprising blocking artifacts, determining (21b) a ringing reference level (JNDR) with a predetermined ringing artifact metric (CM), from a set of reference sequences (RRS) of digital pictures only comprising ringing artifacts, determining (21c) a corner outlier reference level (JNDC) with a predetermined corner outlier metric (CM), from a set reference sequences (CRS) of digital pictures only comprising corner outlier artifacts, measuring (22a,22b,22c) a blocking artifact level (B), a ringing artifact level (R), and a corner outlier level (C) of the input sequence with the blocking artifact metric (BM), the ringing artifact metric (RM), and the corner outlier metric (CM), respectively, and computing (23) the video quality metric (OQM) of the input sequence of digital pictures from ratios of the blocking artifact level (B) to the blocking reference level (JNDB), the ringing artifact level (R) to the ringing reference level (JNDR), and the corner outlier level (C) to the corner outlier reference level (JNDC).

3. A computer program product for an integrated circuit that comprises a set of instructions, which, when loaded into said integrated circuit, causes the integrated circuit to carry out the method as claimed in claim 1.

4. A method of post-processing an input sequence (IS) of digital pictures, said method comprising the steps of:

determining (21) at least one reference level (JND) above which visual artifacts become noticeable to a group of subjects, with a corresponding predetermined artifact metric (M), from a set of reference sequences (RS) of digital pictures only comprising a corresponding artifact, measuring (22) at least one artifact level (L) of the input sequence with the corresponding predetermined artifact metric (M), computing (23) a video quality metric (OQM) of the input sequence from at least one ratio of the artifact level (L) to the reference level (JND) corresponding to a same predetermined artifact metric, and correcting (61) the input sequence of digital pictures as a function of the video quality metric, for providing an output sequence (OS) of digital pictures.

5. A method of encoding an input sequence (IS) of digital pictures, said method comprising the steps of:

first encoding (71) the input sequence of digital pictures for providing encoding parameters, determining (21) at least reference level (JND) above which visual artifact become noticeable to a group of subjects, with a corresponding predetermined artifact metric (M), from a set of reference sequences (RS) of digital pictures only comprising a corresponding artifact, measuring (22) at least one artifact level (L) of the input sequence with the corresponding predetermined artifact metric (M), computing (23) a video quality metric (OQM) of the input sequence from at least one ration of the artifact level (L) to the reference level (JND) corresponding to a same predetermined artifact metric, modifying the encoding parameters as a function of the video quality metric, and second encoding (72) the input sequence of digital pictures for providing a sequence of encoded digital pictures (ES) from the modified encoding parameters (MEP).

6. A device for measuring video quality of an input sequence of digital pictures, comprising:

at least one means (22) for measuring an artifact level (L) with a corresponding predetermining artifact metric (M), means for computing (23) a video quality metric (OQM) of said input sequences from at least one ration of an artifact level (L) to a reference level (JND) determined by a group of subjects, with the corresponding predetermined artifact metric (M), in a sequence of digital pictures only comprising a corresponding artifact, from a level above which visual artifact become noticeable.

7. A device for measuring video quality as claimed in claim 6, comprising:

means for measuring (22a) a blocking artifact level (B) of the input sequences, means for measuring (22b) a ringing artifact level (R) of the input sequence, means for measuring (22c) a corner outlier level (C) of the input sequence, means for computing a video quality metric (OQM) for said input sequence from ratios of the blocking artifact level to a blocking reference level, the ringing artifact level to a ringing reference level, and the corner outlier level to a corner outlier sequence level.

8. A device for post-processing an input sequence (IS) of digital pictures, comprising:

at least one means for measuring (22) an artifact level (L) of the input sequence with a corresponding predetermined artifact metric (M), means for computing (23) a video quality metric (OQM) of the input sequence from at least one ratio of the artifact level (L) to a reference level (JND) determined by a group of subjects, with the corresponding predetermined artifact metric (M), in a sequence of digital pictures only comprising a corresponding artifact, from a level above which visual artifacts become noticeable, and means for correcting (61) the input sequence of digital pictures as a function of the video quality metric, and adapted to a provide an output sequence (OS) of digital pictures.

9. A device for encoding an input sequence (IS) of digital pictures, comprising:

means for a first encoding (71) of the input sequence of digital pictures to provide encoding parameters, at least one means for measuring (22) an artifact level (L) of the input sequence with a corresponding predetermined artifact metric (M), means for computing (23) a video quality metric (OQM) of the input sequence from at least one ration of the artifact level (L) to a reference level (JND) determined by a group of subjects, with the corresponding predetermined artifact metric (M), in a sequence of digital pictures only comprising a corresponding artifact, from a level above which visual artifacts become noticeable, means for modifying the encoding parameters as a function of the level quality metric, and means for a second encoding (72) of the input sequence of digital pictures adapted to provide a sequence of encoding digital pictures (ES) from the modified encoding parameters (MEP).

* * * * *